Sept. 7, 1926.  R. W. DULL  1,598,906

NOISELESS CHAIN

Filed March 20, 1924

Inventor.
Raymond W. Dull.
by Parker & Carter
Attorneys.

Patented Sept. 7, 1926.

1,598,906

UNITED STATES PATENT OFFICE.

RAYMOND W. DULL, OF CHICAGO, ILLINOIS, ASSIGNOR TO LINK-BELT COMPANY, OF CHICAGO, ILLINOIS, A CORPORATION OF ILLINOIS.

NOISELESS CHAIN.

Application filed March 20, 1924. Serial No. 700,463.

My invention relates to an improvement in chains, and particularly to an improvement in the type of chain wherein a plurality of laterally aligned link elements are joined to each other by transverse bearing pins. One object of the invention is to provide a chain which shall be particularly cheap to manufacture and easy to assemble. Another object is to increase the life of such a chain by increasing the bearing area of the relatively moving parts. Another object is to dispense with the necessity of using bushings to join the laterally aligned link parts. Another object is to provide a lighter, and therefore smoother running chain in which a maximum strength is obtained with a minimum weight. Another object is to provide a chain in which the individual link elements may be formed of thin stock. Other objects will appear from time to time in the course of the specification and claims.

I illustrate my invention more or less diagrammatically in the accompanying drawings, wherein—

Like parts are illustrated by like characters throughout the specification and drawings.

Figure 3:
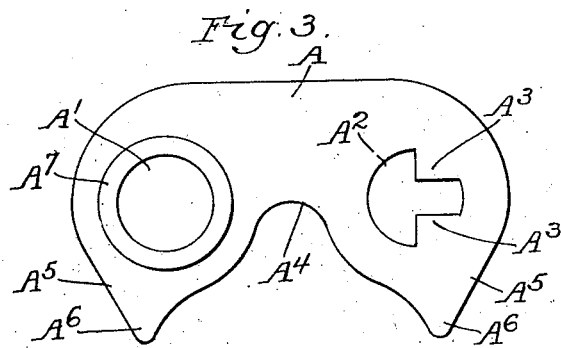
Figure 3 is a side view of an individual link section.
Figure 5:
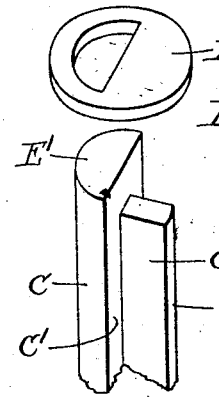
Figure 5 is a perspective of the transverse aligning and bearing pin and washer.
Figure 4:
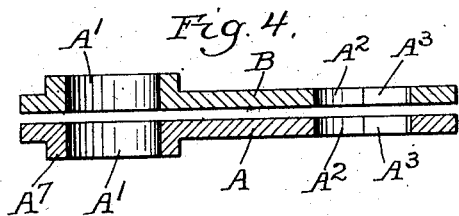
Figure 4 is a section on the line 4—4 of Figure 3.

The chain is made up of a plurality of link sections such as the one shown in Figure 3, comprising a body portion A having the circular aperture $A^1$ at one end and a deformed aperture $A^2$ in the other end, comprising, for example, an arcuate portion interrupted by the inwardly projecting angles $A^3$. The central portion of the link is reduced as at $A^4$ in contrast to the downwardly depending end portions $A^5$, $A^5$ which terminate in the teeth $A^6$. Surrounding the circular aperture $A^1$ is the circular flange $A^7$ projecting outwardly from one side of the link, the other side being plane.

It will be understood that two main types of link members are used, the type A above described, and a companion link element B identical save that the relation of the parts is reversed so that when link elements A and B are placed with their plane sides in opposition, their circular and deformed apertures are aligned and the circular flanges project at opposite sides from the link section formed by the adjacent pair of link elements. The chain is formed by joining pairs of link members side by side in the above described fashion and passing through the deformed apertures $A^2$ a bearing pin comprising, for example, a portion C having a semi-cylindrical bearing surface and the reduced portion $C^2$ projecting from the flat plane surface $C^1$ and terminating in a bearing surface $C^3$ concentric with the bearing surface of the portion C. The pin C being shaped to conform to the deformed aperture $A^2$, will not rotate in relation to such of the link elements as it penetrates through such aperture.

Figure 1:
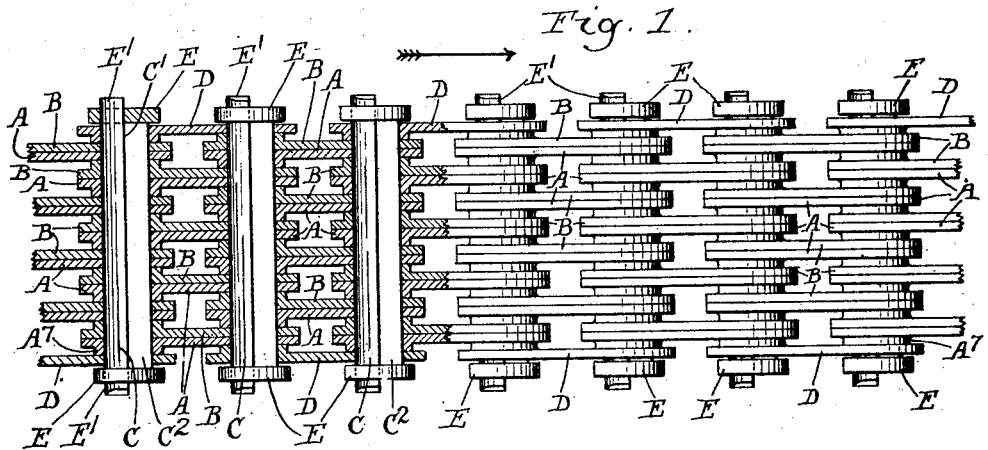
Figure 1 is a plan view of a portion of the chain with parts cut away.

The link elements are so arranged on the pins C that each of such pins passes alternately through the deformed apertures of one pair of link members and the circular flanged apertures of the next, as shown in Figure 1.

Figure 2:
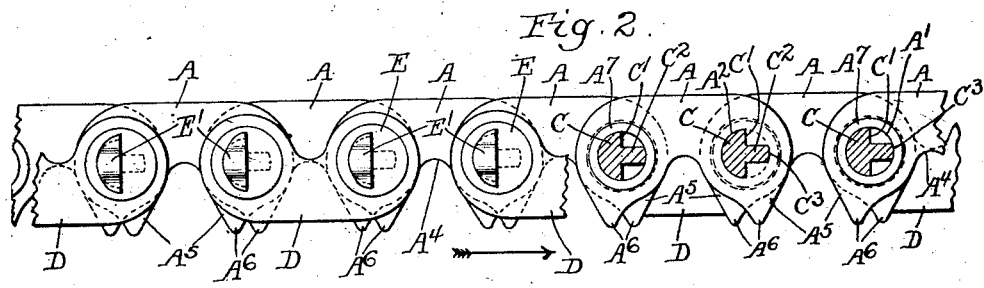
Figure 2 is a side elevation with parts broken away.

For the flange links, which serve to keep the chain from slipping laterally, I may use a link element identical with the element A, with the teeth $A^6$ cut down. By reversing it to place it in the position shown at D in Figures 1 and 2, I may employ its plane or upper edge as the flange. Regardless of the type of flange link I employ, and I do not limit myself to the one above described, I prefer to stagger the flange links as shown in Figure 1, having one flange link connecting each adjacent pair of bearing pins, the connection between the successive pins alternating from side to side of the chain. Upon the bearing pins I may fasten the chain in any suitable manner, but I illustrate herein a washer E adapted to receive the upwardly projecting portion $E^1$ of the pin and to rest upon the end of the deformed portion $C^2$. The end $E^1$ may then be upset, to secure the links on the pin.

It will be realized that while I have illustrated a working device, many changes may be made in the size, shape, proportion and relation and disposition of parts without departing from the spirit of my invention, and I do not wish to be limited to the specific form and arrangement herein shown and described.

The use and operation of my invention are as follows:

When chain of the type herein described is used, the terminal flange links prevent the chain from slipping laterally from the sprockets or other members about which its passes, the sprocket teeth penetrating between the pointed teeth of the inner link sections.

The chain is particularly simple to manufacture, since it may be manufactured with but two forms of link members, and those may be blanked out of the same stock.

No bushing or any other similar bearing member need be used, since the wear of the link sections on the pins is reduced by increasing the bearing area. The round aperture which rotates about the bearing pin is reinforced by the flange $A^7$ which not only provides a relatively extended bearing area, but serves as a positive reinforcement of the link body. It is therefore possible to use thin stock; by diminishing the thickness of the stock, and increasing the height of the flange, the actual weight of metal in a given width of chain is reduced to a minimum. The end of the link element penetrated by the deformed aperture, since it does not rotate in relation to the pin passing through it, may be left thin and unreinforced. Whereas I have illustrated a link member which consists merely of a thin blank with a reinforcing flange about the aperture at one end, I might of course employ a link member increasing in thickness progressively or abruptly from one end to the other, in such fashion that the bearing or rotating end of the link is strengthened in relation to the end of the link which does not rotate about the pin.

By employing highly resistant material, such as chrome nickel, I can employ a very light stock, and produce a very light and smooth running chain.

While it is preferable to flange but one side of each link blank, I do not limit myself to that type.

I claim:

1. In a laminal chain, a plurality of flat, one-piece laminæ apertured at each end, securing pins passing through each end of each lamina and directly contacting the laminæ through which they pass, each lamina being in rotational bearing contact with the pin penetrating one end, and being held against rotation in relation to the pin passing through its other end, the aperture of that end only of each lamina which is in rotational bearing contact with the pin being reinforced, producing an increased bearing surface.

2. In a laminal chain, a plurality of flat, one-piece laminæ apertured at each end, securing pins passing through each end of each lamina and directly contacting the laminæ through which they pass, each lamina being in rotational bearing contact with the pin penetrating one end, and being held against rotation in relation to the pin passing through its other end, the aperture of that end only of each lamina which is in rotational bearing contact with the pin being provided with a cylindrical bearing surface of greater length than the normal thickness of the lamina.

3. A sprocket chain comprising a plurality of flat, laminal link elements, apertured at each end, securing pins passing through each end of each lamina and directly contacting the laminæ through which they pass, each lamina being adapted to rotate in relation to the pin penetrating one end, and being held against rotation in relation to the pin penetrating the other end, a reinforcing flange surrounding the aperture of the rotating end, said laminæ being arranged back to back with the flange of each lamina projecting outwardly, such pairs of laminæ being arranged along the securing pins, the unflanged ends of one pair being positioned between the flanged ends of the adjacent pairs.

4. A chain comprising a plurality of transverse bearing pins, flat, laminal link elements, perforated at each end, connecting them and in direct contact therewith, each such link element having struck out at one end an annular reinforcement surrounding the perforation, and concentric therewith, the reinforced ends of the link elements penetrated by each pin alternating with the unreinforced ends of the adjacent link elements.

5. A chain comprising a plurality of transverse bearing pins, link elements connecting them, each such link element being reinforced at one end, the reinforced ends of the link elements penetrated by each pin alternating with the unreinforced ends of the adjacent link elements, the reinforced end of each such element being rotatable about the pin penetrating it, and the unreinforced end being held against rotation about the pin penetrating it.

6. A chain comprising a plurality of transverse bearing pins, link elements connecting the pins, each such link element being reinforced at one end, the reinforced ends of the link elements penetrated by each pin alternating with the unreinforced ends of the adjacent link elements, each such element comprising a pair of link units, each having a reinforcing flange projecting from one surface thereof.

7. A chain comprising a plurality of transverse bearing pins, link elements connecting them, each such link element being reinforced at one end, the reinforced ends of the link elements penetrated by each pin alternating with the unreinforced ends of the adjacent link elements, the reinforced end of such element being rotatable about the pin penetrating it, and the unreinforced end being held against rotation about the pin penetrating it, each such element comprising a pair of link units each having a reinforcing flange projecting from one surface thereof.

8. A chain link element comprising a flat link body, a tooth at each end thereof, an intermediate, relatively narrow connecting portion, an aperture in each tooth, the aperture in one tooth being circular and that in the other tooth being non-circular, and a circular reinforcing flange surrounding said circular aperture, the inner surface thereof forming an extension of the cylindrical bearing surface formed by the wall of the aperture.

9. A chain comprising a plurality of link sections, each end of each such sections being perforated, bearing pins passing through such sections, each section comprising a pair of separate laminæ, the pairs of laminæ of each link being spaced apart on said bearing links by the ends of the link sections of the adjacent links, the link sections of one link alternating along each pin with the link sections of the next link, the laminæ of each link being rotatable about the pin which passes through one end thereof and being held against rotation about the pin which passes through the opposite end thereof, the ends of each of the laminæ which rotate in relation to the pin passing through them being formed to expose to said pin a bearing surface greater than the normal thickness of the laminæ.

10. In a laminal chain, a plurality of transverse pins, the pins having arcuate bearing surfaces and non-arcuate surfaces, the non-arcuate surfaces lying within the periphery of the circles indicated by the arcuate surfaces, a plurality of flat laminæ, perforated at each end, laterally aligned along the pins, each lamina being in direct contact with the pins passing through its ends, the perforation of one end of each lamina being circular, the perforation at the other end conforming to the cross section of the pin which passes therethrough, the circular aperture of each lamina being reenforced.

11. In a laminal chain, a plurality of transverse pins, the pins having arcuate bearing surfaces and non-arcuate surfaces, the non-arcuate surfaces lying within the periphery of the circles indicated by the arcuate surfaces, a plurality of flat laminæ, perforated at each end, laterally aligned along the pins, each lamina being in direct contact with the pins passing through its ends, the perforation of one end of each lamina being circular, the perforation at the other end conforming to the cross section of the pin which passes therethrough, the circular aperture of each lamina being reenforced with an outwardly projecting annular rim the inner surface of which forms an extension of the cylindrical bearing surface formed by the walls of the aperture.

Signed at Chicago county of Cook and State of Illinois, this 12th day of March 1924.

RAYMOND W. DULL.